US010129079B2

(12) United States Patent
Olsson et al.

(10) Patent No.: US 10,129,079 B2
(45) Date of Patent: Nov. 13, 2018

(54) TELECOMMUNICATIONS SYSTEM AND METHOD

(71) Applicant: Telefonaktiebolaget LM Ericsson (publ), Stockholm (SE)

(72) Inventors: Lasse Olsson, Stora Höga (SE); Di Liu, Shanghai (CN); Mikael Östborn, Göteborg (SE); Qi Xia, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/520,007

(22) PCT Filed: Oct. 23, 2014

(86) PCT No.: PCT/CN2014/089294
§ 371 (c)(1),
(2) Date: Apr. 18, 2017

(87) PCT Pub. No.: WO2016/061788
PCT Pub. Date: Apr. 28, 2016

(65) Prior Publication Data
US 2017/0331678 A1     Nov. 16, 2017

(51) Int. Cl.
*H04W 4/02*     (2018.01)
*H04L 12/24*    (2006.01)
*H04L 29/08*    (2006.01)

(52) U.S. Cl.
CPC ...... *H04L 41/0803* (2013.01); *H04L 41/0893* (2013.01); *H04L 41/5022* (2013.01); *H04L 67/18* (2013.01); *H04W 4/023* (2013.01)

(58) Field of Classification Search
CPC .. H04M 15/66; H04M 15/60; H04M 15/8044; H04M 15/61; H04M 15/80;
(Continued)

(56) References Cited

U.S. PATENT DOCUMENTS

2012/0129488 A1    5/2012   Patterson et al.
2013/0176908 A1*   7/2013   Baniel ................. H04L 12/1407
                                                          370/259
(Continued)

FOREIGN PATENT DOCUMENTS

CN     101272274 A1    9/2008
CN     101296096 A1    10/2008
WO     2013170347 A1   11/2013

OTHER PUBLICATIONS

International Search Report and Written Opinion dated Jun. 29, 2015 for International Application Serial No. PCT/CN2014/089294, International Filing Date: Oct. 23, 2014 consisting of 8-pages.
(Continued)

*Primary Examiner* — Kwasi Karikari
(74) *Attorney, Agent, or Firm* — Christopher & Weisberg, P.A.

(57) ABSTRACT

Methods and elements are disclosed for controlling services in a specific location in a wireless communication network, by configuring a policy comprising service control information and location based information corresponding to the specific location for controlling services for user equipments, UEs in the location from a second core network element.

16 Claims, 4 Drawing Sheets

(58) Field of Classification Search
CPC ......... H04M 15/8022; H04M 15/8351; H04M 15/00; H04M 15/58; H04M 15/8016; H04M 15/8027; H04M 15/8033; H04M 15/8055; H04M 15/8083
See application file for complete search history.

(56) References Cited

U.S. PATENT DOCUMENTS

| | | | |
|---|---|---|---|
| 2014/0022897 A1* | 1/2014 | Rajagopalan | H04W 28/0215 370/230 |
| 2015/0049648 A1* | 2/2015 | Chatras | H04M 15/66 370/259 |

OTHER PUBLICATIONS

3GPP TS 23.401 V14.2.0 (Dec. 2016) 3rd Generation Partnership Project; Technical Specification Group Services and System Aspects; General Packet Radio Service (GPRS) Enhancements for Evolved Universal Terrestrial Radio Access Network (E-UTRAN) Access (Release 14) Dec. 16, 2016 consisting of 385-pages.
European Search Report dated Mar. 15, 2018 for European Application No. EP 14 90 4220 filed on Oct. 23, 2014 consisting of 8-pages.
3GPP TR 23.843 V12.0.0 Title: "3rd Generation Partnership Project; Technical Specification Group Services and System Aspects; Study on Core Network Overload (CNO) Solutions"; (Release 12) Dec. 2013, consisting of 48-pages.

\* cited by examiner

TELECOMMUNICATIONS SYSTEM AND METHOD

CROSS-REFERENCE TO RELATED APPLICATIONS

This application is a Submission Under 35 U.S.C. § 371 for U.S. National Stage Patent Application of International Application Number: PCT/CN2014/089294, filed Oct. 23, 2014 entitled "TELECOMMUNICATIONS SYSTEM AND METHOD," the entirety of which is incorporated herein by reference.

TECHNICAL FIELD

The present disclosure relates to telecommunications, particularly to system and method of controlling services in a specific location.

BACKGROUND

More and more social services are taking part in the networked society, including video services, and this is something we expect, promote and welcome with our existing solutions. The drawback today is that these services in some scenarios are using too many resources and may consume resources that block other services. Today there is no intuitive way to prioritize data flows based on the combination of service, subscription and geographical location. Let's say we have a forest fire and would like to prioritize rescue services, or say we would like to disturb communications among criminals in a specific location.

There is currently no way to actually stop a service in a designated location or to prioritize certain subscriber services based on the real time location. You can use Allocation and Retention priority, ARP, to solve the problems, but that will have an impact over the whole network, or at least over a big area. So the solution that exists today is too coarse to actually be practically feasible.

SUMMARY

Therefore, it is an object of the present disclosure to solve at least one of the above-mentioned problems.

According to an aspect of the present disclosure, a method for a first core network element in a wireless communication network controlling services in a specific location is provided. The method comprises: receiving a policy comprising service control information comprising at least information of first service control, and location based information corresponding to the specific location for controlling services for user equipments (UEs) in the location from a second core network element; determining service statistics and location based information for at least a UE; implementing the service control, or not, of the UE according to the policy.

The location based information comprises one or more of the following: radio base station IP, mobile management entity IP, tracking area, Evolved Universal Mobile Telecommunications System (UMTS) Terrestrial Radio Access Network (E-UTRAN) cell global identifier or one or more of the following: one or more of the following: a list of idle UEs and connected UEs in the location. The policy may further comprise at least a list of UEs for at least second service control of the UEs in the list. The at least a UE may be a UE currently in the service and/or that initiates a request for the service.

According to another aspect of the present disclosure, a first core network element in a wireless communication network for controlling services in a specific location is provided. The element comprises: a first interface adapted for communicating with a second core network element; a second interface adapted for communicating with at least one UE; and a controlling unit adapted for: receiving a policy comprising service control information comprising at least information of first service control, and location based information corresponding to the specific location for controlling services for UEs in the location via the first interface; determining service statistics and location based information for at least a UE via the second interface; implementing the service control, or not, of the UE according to the policy.

According to a further aspect of the present disclosure, a method for a network element in a wireless communication network configuring a policy of controlling services in a specific location is provided. The method comprises: receiving input for configuring a policy of controlling services in a specific location; sending a policy based on the input to a second core network node.

According to a still further aspect of the present disclosure, a network element in a wireless communication network for configuring a policy of controlling services in a specific location is provided. The element comprises: a first interface adapted for obtaining input for configuring a policy of controlling services in a specific location; a second interface adapted for communicating with a second core network node; and a controlling unit adapted for: receiving input for configuring a policy of controlling services in a specific location via the first interface; sending a policy based on the input to a second core network element via the second interface.

According to a still further aspect of the present disclosure, a method for a second core network element in a wireless communication network controlling services in a specific location is provided, the method comprises: receiving a policy comprising service control information and location based information corresponding to the specific location for controlling services for user equipments, in the location from a network element; transmitting the policy to a first core network element adapted for implementing service control of the UEs according to the policy.

According to a still further aspect of the present disclosure, a second core network element in a wireless communication network for controlling services in a specific location, the element comprises: a first interface adapted for communicating with a network element; a second interface adapted for communicating with a first core network element; and a controlling unit adapted for: receiving a policy comprising service control information and location based information corresponding to the specific location for controlling services of UEs, in the location via the first interface; transmitting the policy to a first core network element adapted for implementing service control of the UEs according to the policy via the second interface.

By configuring the first core network element, such as a Packet Gateway (PGW), through a policy comprising service control information and location based information, services in an specific geographical location, be it a big area or a small area, can be dynamically coordinated.

BRIEF DESCRIPTION OF THE DRAWINGS

The invention will be described in detail by reference to the following drawings, in which.

DETAILED DESCRIPTION

Figure 1:
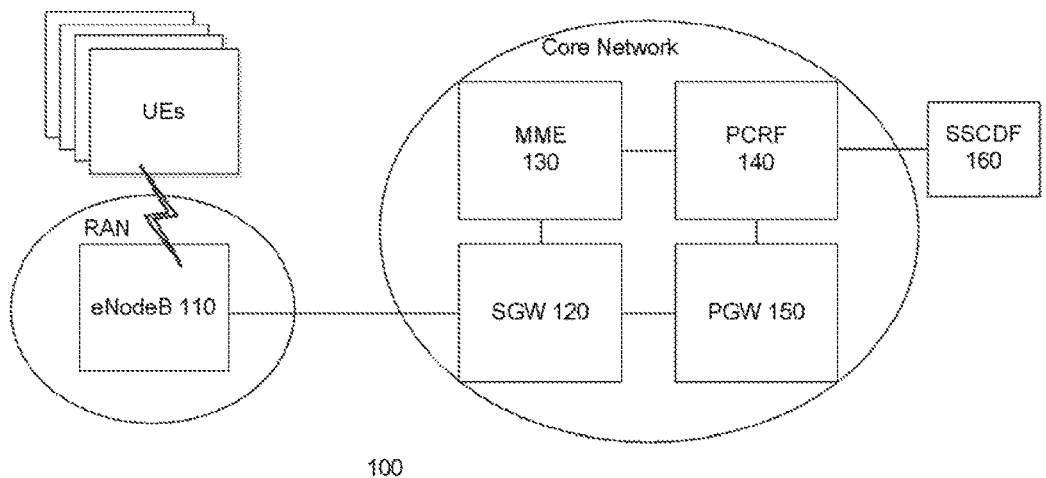
FIG. 1 illustrates a schematic view of a Long Term Evolution (LTE) network 100 including entities involved in the UE service control.

Embodiments of the present disclosure will be described more fully hereinafter with reference to the accompanying drawings, in which embodiments of the disclosure are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the disclosure is described with reference to the LTE in the context, the skilled in the art should understand that the invention is not limited to this, but can indeed be applied to all existing and future wireless communication networks as appropriate. Although specific terms are used here, such as UE and eNodeB, it should be understood that the invention is not limited to those specific terms but can be applied to all similar entities.

Embodiments of the disclosure will be described below with reference to the drawings.

FIG. 1 illustrates a schematic view of a Long Term Evolution (LTE) network 100 including entities involved in the UE service control.

The LTE network 100 includes a Radio Access Network (RAN, referred to as E-UTRAN in LTE) and a Core Network (CN, referred to as EPC in LTE). The eNodeB 110 is an element of the RAN which is capable to communicate with UEs located in its coverage. The Serving Gateway (SGW) 120, MME 130, PCRF 140, and PDN Gateway (PGW) 150 are elements of the core network. The functions of these elements/nodes are defined in 3GPP specifications and will not be discussed in detail herein. The Smart Service Control Decision Function (SSCDF) acts as an interface for the service control administrators to input service control configurations, which may be functionality collocated with legacy network element or independently located in the LTE network 100 and it does not belong to the core network.

Figure 2:
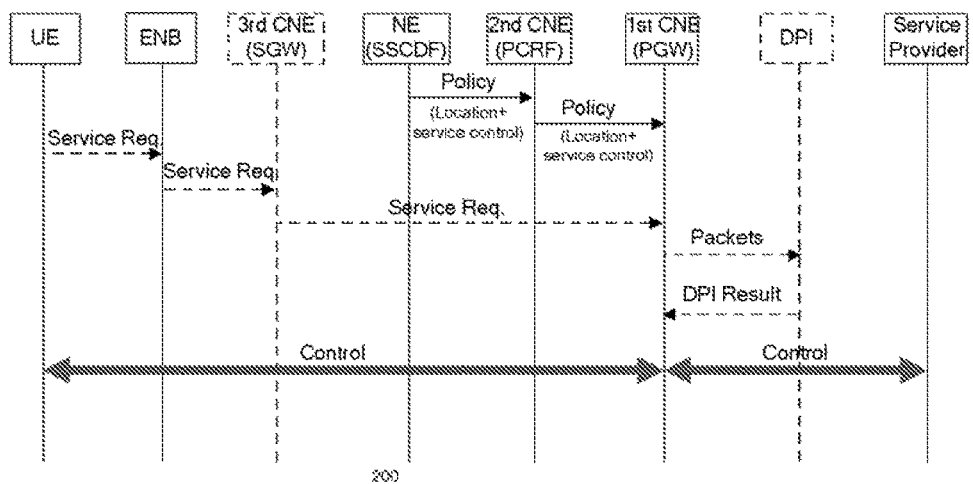
FIG. 2 illustratively shows a signaling flow 200 of the UE service control in a wireless communication network in accordance to an embodiment of the disclosure.

FIG. 2 illustratively shows a signaling flow 200 of the UE service control in accordance to an embodiment of the disclosure.

As shown in FIG. 2, a policy comprising service control information comprising at least information of first service control, and location based information for controlling services of User Equipments (UE) in the location is sent from a network element to a second core network element. The network element may be a functionality collocated with legacy network element or independently located in the LTE network 100, which may be SSCDF that acts as an interface for the service control administrators to input service control configurations. The input service control configurations can comprise location information wherein service control is intended for the location. Generally, the location information as input by the administrator may not be network user location information, such as Routing Area (RA), Tracking Area (TA), eNodeB identifier, eNodeB IP address or E-UTRAN Cell Global Identifier (ECGI), Mobility Management Entity (MME) identifier or MME IP address etc., which can represent a certain range of area and identifiable by the core network. It is possible that the location information as input by the administrator is geographical location information represented by, e.g. latitude and longitude coordinates. In this case, the geographical location information may be converted to the network user location information thereafter by, e.g. any core network element capable of doing this and in communication with SSCDF, or the SSCDF itself, which maintains a mapping table between geographical location information and network user location information. The mapping table can be configured therein, or synchronized from the core network. Herein, network user location information refers to the UE location information identifiable by the core network, e.g. those of different granularity levels, such as RA, TA, eNodeB identifier or eNodeB IP address, or ECGI, MME ID or MME IP address depending on the intended area. The first service control can be bit rate limitation, e.g., only services with bit rate of lower than 2 Mbps are allowed, content limitation, e.g., some pornographic websites are forbidden, or service priority, e.g., a rescue service is configured the highest priority. Additionally, the service control information may further comprise at least a list of UEs for at least second service control of the UEs in the list. For example, under such second service control, the above mentioned first service control will not be applied to the UEs in the list as the other UEs in the location, but a different service control will be applied to the UEs in the list. Other examples may be applied, for example, there are 2 lists of UEs, one for upgrade priority of all UEs in the list, and the other for downgrade priority of all UEs in the other list, which both service controls are different from that for the UEs in the location other than the UEs in the list. SSCDF may apply access control for the administrators to log in, such as authentication and authorization.

The second core network element may be, e.g., a Policy and Charging Rules Function (PCRF). In response to receiving the policy, the second core network node, such as PCRF, forwards the policy to a first core network element, e.g., Packet Gateway (PGW). The first core network element will configure itself with the policy for further operation.

It will be appreciated by one skilled in the art that the policy sent from the network element to the second core network element and the policy sent from the second core network element to the first core network element may or may not be of the same format, may be in a legacy message such as a Re-Auth Request, a diameter message, or in a new type of message.

Afterwards, for future services, when the UE initiates a service request and transmits it through the eNodeB to the first core network element, the first core network element will check the network user location and requested service statistics of the UE and applies the policy accordingly. For example, if the policy is: blocking all services above 2 Mbps for the bronze subscribers served in sector 1 of eNodeB 110, and if the PGW receives a service request, it will check the network user location, the subscription level, and the requested service bit rate, and in case that the UE is a bronze subscriber served in sector 1 of eNodeB 110 and requests a service above 2 Mbps, the PGW will not request a corresponding service provider for the service, but may simply abandon the service request, or may reply with a service response indicating failure. For another example, if the policy is: blocking half of services above 2 Mbps for the bronze subscribers served by eNodeB 110 randomly, and if the PGW receives a service request, it will check the network user location, e.g., eNodeB ID, the subscription level, and the requested service bit rate, and in case that the UE is a bronze subscriber served by eNodeB 110 and requests a service above 2 Mbps, the PGW will sometimes request a corresponding service provider for the service while sometimes not but rather abandon the service request, or reply with a service response indicating failure, with a ratio of possibility of 1:1.

Alternatively, for on-going services, the service control policy can't be applied from the beginning of the services, but can be applied upon it is configured. The first core network element will check current data flows for the network user location and on-going service statistics of at least one UE and applies the policy accordingly, and the first core network element sends a corresponding service response to the UE. For example, if the policy is: blocking all services for the bronze subscribers served in TA1 comprising for example two eNodeBs, the PGW will check the data flow for the network user location and the subscription level, and in case that a UE is a bronze subscriber served by one of the two eNodeBs and is enjoying a service, the PGW will stop providing the service. For another example, if the policy is: downgrade priorities of services above 2 Mbps for all the bronze subscribers served by eNodeB 110. The PGW will check the data flow for the network user location, the subscription level, and the service bit rate, and in case that the UE is a bronze subscriber served by eNodeB 110 and is enjoying a service above 2 Mbps, the PGW will downgrade the priority of current service.

It will be appreciated by one skilled in the art that the subscription level can be obtained by legacy procedures.

It will be appreciated by one skilled in the art that for sake of simplicity, the network user location information can only comprise eNodeB IP address. Accordingly, resource consumption is saved, with a little bit coarse granularity level of location resulted, i.e., the lowest granularity level is a cell, and thus controlling services in a sector of a cell can't be implemented, unless a mapping table between the UE IP address and the sector ID can be obtained in the PGW.

In some scenarios, e.g., the service request is routed to the first core network element through a third core network element, e.g., service gateway (SGW), then for the PGW to easily recognize where the service request is from, the third core network element needs to keep the user location, e.g. eNodeB IP address, in the service request.

In some scenarios, deep packet inspection (DPI) is needed to inspect the service request or communicated data packets for the service between the UE and the first core network element for service statistics. Deep packet inspection functionality can be located independently or collocated with the first core network element. DPI can be done to determine the service statistics for further policy applying. In some scenarios, corresponding packets will be delivered to the DPI functionality from the first core network element and a DPI results will be returned, thus the service statistics are obtained. It will be appreciated by one skilled in the art that if the policy is blocking all the services for UEs served by eNodeB 110, then DPI is not required.

It is noted that the service statistics comprise the service related information which can be obtained from the service request or service data flow, such as service content, service bit rate, service priority, etc.

In one embodiment, the administrator may configure some UEs with privileges, such information can be comprised in the policy, such as in the form of list of UEs for special handling, and carried out by the first core network element.

The administrator can input duration, or a termination trigger, or condition for carrying out the policy, either alone or together with other service control configurations, accordingly, such information can be comprised in the policy or sent in other messages independently to the first network element.

It will be appreciated by one skilled in the art that although in some embodiments only one UE is described, the embodiments can be applied to multiple UEs concurrently.

It will be appreciated by one skilled in the art that the UE ID can be Mobile Subscriber International ISDN/PSTN number (MSISDN), UE IP, International Mobile Subscriber Identification Number (IMSI), etc.

Figure 3:
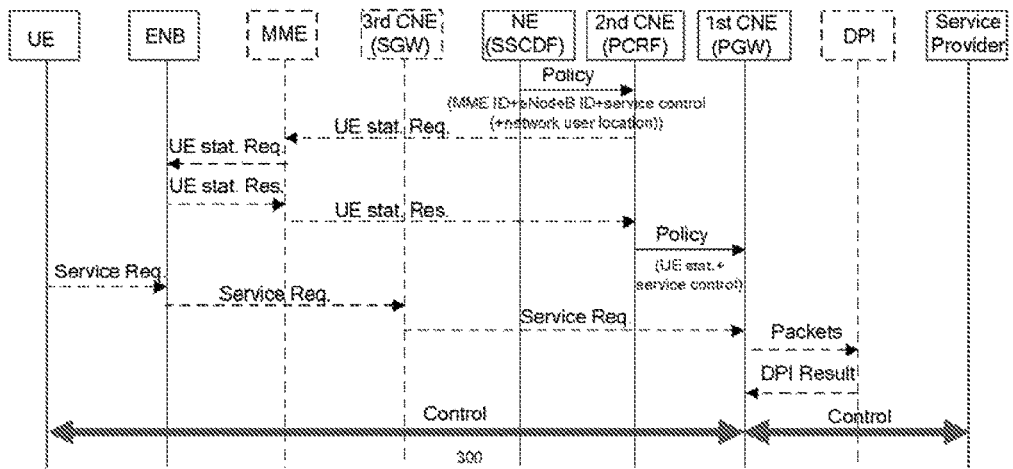
FIG. 3 illustratively shows a signaling flow 300 of the UE service control in a wireless communication network in accordance to an embodiment of the disclosure.

FIG. 3 illustratively shows a signaling flow 300 of the UE service control in accordance to an embodiment of the disclosure.

The SSCDF acts as an interface for the service control administrators to input service control configurations. The input service control configurations can comprise location information wherein service control is intended for the location. Generally, the location information as input by the administrator is geographical location information represented by, e.g. latitude and longitude coordinates. In this case, the geographical location information may be converted to the corresponding Mobility Management Entity (MME) identifier (ID) and eNodeB identifier thereafter by, e.g. any core network element capable of doing this and in communication with SSCDF, or the SSCDF itself, which maintains a mapping table between geographical location information and corresponding MME ID and eNodeB ID. The mapping table can be configured therein, or synchronized from the core network.

The input service control configurations also comprise service control information comprising at least information of first service control. The first service control may be bit rate limitation, e.g., only services with bit rate of lower than 2 Mbps are allowed, content limitation, e.g., some pornographic websites are forbidden, or service priority, e.g., a rescue service is configured the highest priority. Additionally, the service control information may further comprise at least a list of UEs for at least second service control of the UEs in the list. For example, under such second service control, the above mentioned first service control will not be applied to the UEs in the list as the other UEs in the location, but a different service control will be applied to the UEs in the list. Other examples may be applied, for example, there are 2 lists of UEs, one for upgrade priority of all UEs in the list, and the other for downgrade priority of all UEs in the other list, which both service controls are different from that for the UEs in the location other than the UEs in the list. SSCDF may apply access control for the administrators to log in, such as authentication and authorization.

After the MME ID and eNodeB ID are obtained, a first policy comprising service control information and MME ID and eNodeB ID for controlling services of UEs locating in the designated location is sent from the network element to a second core network element, as shown in FIG. 3. The second core network element may be, e.g., a Policy and Charging Rules Function (PCRF).

In one embodiment, upon the second core network element receives MME ID and eNodeB ID, it may send a UE statistics request to one or more eNodeBs, through a corresponding MME, to collect UE statistics. The UE statistics can be collected in a variety of ways. In one embodiment, the eNodeB receives at least one UE statistics request, and broadcasts information corresponding to the UE statistics request to idle UEs located in the base station to trigger the idle UEs to establish Radio Resource Control (RRC) connections with the eNodeB. The information broadcasted by the eNodeB may or may not have the same format as that of the UE statistics request. The idle UEs, when receiving the broadcasted at least one UE statistics request, establish the RRC connections with the eNodeB. The procedure of RRC connection establishment is defined in the 3GPP specifications and will not be discussed in detail herein. During the RRC connection establishment with the idle UEs, the eNodeB may obtain various statistics of these UEs from the RRC connections. For example, ID, or additionally network user location information of different granularity levels of each UE. The eNodeB then transmits to the network element a UE statistics response that includes the obtained idle UE statistics. The network element receives from the eNodeB the UE statistics response message that includes the idle UE statistics. In case there is more than one eNodeB involved, the network element receives from all the involved eNodeBs the UE statistics response messages respectively. The network element also obtains UE statistics of connected UEs located in the at least one eNodeB according to the methods of the prior art. The UE statistics in the designated location is thus accurately and efficiently collected and can be used for service control policy configurations.

The UE statistics request may be any message that is capable of triggering the idle UEs receiving the request to establish RRC connections with the eNodeB. To minimize the impact to the existing 3GPP standard, it is proposed to reuse the RRC paging message as defined in the 3GPP specification. Two exemplary embodiments will be discussed hereinafter.

In one embodiment, the at least one UE statistics request may be the standard RRC paging messages. Each RRC paging message, hereinafter referred to as specific RRC paging message, is addressed to one specific idle UE. In this case the network element, such as the SSCDF, may have a record for the idle UEs and knows which eNodeB is serving a specific UE, but however may not ascertain whether or not the idle UEs are indeed located in coverage of the eNodeB, and can not obtain the accurate location information of the UEs. The network element transmits to the at least one eNodeB specific RRC paging messages and then the at least one eNodeB broadcasts the specific RRC paging messages over air interface. A specific idle UE monitors the specific RRC paging message on the paging occasions assigned to the UE. When the specific RRC paging message addressed to the specific idle UE is received, the specific idle UE establishes a RRC with the eNodeB. In this embodiment, the standard RRC paging message does not need to be modified and the UE statistics collection procedure is transparent to the UE. The impact to the eNodeB and the MME is also minimized.

In another embodiment, the at least one UE statistics request may be a newly defined RRC paging message, hereinafter referred to as general RRC paging message. The general RRC paging message is not addressed to any specific idle UE but to all idle UEs. The general RRC paging message may be derived by modifying the standard RRC paging message, e.g. by removing the specific idle UE address information contained in the standard RRC paging message or replacing it with a predefined value so that any idle UE that receives the message will recognize it. The network element transmits the same general RRC paging message to the at least one eNodeB which in turn broadcasts the same general RRC paging message to the idle UEs. Each idle UE, when receiving the general RRC paging message, establishes a RRC with the eNodeB. As compared with the preceding embodiment, the consumed signaling resources are greatly reduced which is especially important for the location where heavy traffic has happened.

The RRC connections are intentionally established for purpose of UE statistics collection. To further reduce the resource consumption, the specific RRC paging message or general RRC paging message may comprise an indicator to indicate the idle UEs to release the RRC connections in a time period after establishment of the RRC connections respectively.

Accordingly, a UE statistics response is sent all the way back to the second core network element, comprising at least a list of UE IDs attached to the one or more eNodeBs, and in a further embodiment, or additionally network user location information of different granularity levels of each UE.

In another embodiment, there can be a mapping table between eNodeBs and their currently serving UEs, maintained and updated periodically in the second core network element following a similar manner as described above. Thus a list of UE IDs in the designated location can be immediately obtained. Furthermore, a mapping table between geographical location information and its corresponding network user location information can be maintained and updated periodically in the SSCDF or obtained from a core network element capable of doing the mapping and in communication with the SSCDF, and the mapped network user location information can be sent to the second core network element, independently or in the first policy.

For purpose of clarity, the network user location information, and UE statistics comprising at least a list of UEs within the location or additionally network user location information of the UE, are both referred to as location based information herein. After the UE statistics are obtained, the second core network node, such as PCRF, sends a second policy to a first core network element, e.g., packet gateway (PGW), comprising service control information and UE statistics comprising at least a list of UE IDs for the designated location. As the UEs in the list covers a range not smaller than a cell, which may be larger than the designated location, the list of UE IDs may be shrunk according to the mapped network user location in the second core network element, for example from a location of a cell to a sector of a cell. In such an example, the mapped network user location corresponding to the designated location and network user location information of each UE in the list should be known by the second core network element. Alternatively, such a shrinking can also be done at the first core network element. The first core network element will configure itself with the second policy for further operation.

It will be appreciated by one skilled in the art that the policy sent from the second core network element to the first core network element may be in a legacy message such as a Re-Auth Request, which is a diameter message, or in a new type of message.

Afterwards, for future services, when the UE initiates a service request and transmits it through the eNodeB to the first core network element, the first core network element will check the UE statistics and requested service statistics of the UE and applies the second policy accordingly. For example, if the second policy is: blocking all services above 2 Mbps for UEs in a list of UE IDs, and if the PGW receives a service request from a UE, it will check UE ID, and the requested service bit rate, and in case that the UE belongs to the list of UE IDs and requests a service above 2 Mbps, the PGW will not request a corresponding service provider for the service, but may simply abandon the service request, or may reply with a service response indicating failure. It is noted that if the network user location information of each UE is not obtained, then the list of UE IDs comprises IDs of all UEs attached within the whole eNodeB coverage, rather than just sector 1 of the eNodeB. Otherwise, UEs of sector 1 of the eNodeB can be picked out according to the obtained UE statistics. Besides, it is also noted that in the latter case, SSCDF maintains or obtains a mapping between GEO and network user location. For another example, if the second policy is: blocking half of services above 2 Mbps for all UEs in a list of UE IDs randomly, and if the PGW receives a service request from a UE, the PGW will check the UE ID, the subscription level, and the requested service bit rate, and in case that the UE is belongs to the list and requests a service above 2 Mbps, the PGW will sometimes request a corresponding service provider for the service while sometimes not but rather abandon the service request, or reply with a service response indicating failure, with a ratio of possibility of 1:1.

Alternatively, for on-going services, the service control policy can't be applied from the beginning of the services, but can be applied upon it is configured. The first core network element will check current data flows for the UE statistics and on-going service statistics of at least one UE and applies the policy accordingly, thus the first core network element sends a corresponding service response to the UE. For example, if the policy is: blocking all services for UEs in a list of UE IDs, then the PGW will check the data flow for the UE ID, and the on-going service bit rate, and in case that a UE belongs to the list and is enjoying a service above 2 Mbps, the PGW will stop providing the service. For another example, if the policy is: downgrade priorities of services above 2 Mbps for all the UEs in a list of UE IDs. The PGW will check the data flow for the UE ID and the on-going service bit rate, and in case that the UE belongs to the list and is enjoying a service above 2 Mbps, the PGW will downgrade the priority of current service.

It will be appreciated by one skilled in the art that for sake of simplicity, when the first policy is intended for a location with granularity level not smaller than whole eNodeB coverage, the network user location information can not be comprised in the first policy or sent independent to the second core network element. Accordingly, a conversion from the input geographical location to the network user location information can be waived, and the network user location information of each UE in the list of UE IDs is not required, thus resource consumption is saved.

In some scenarios, deep packet inspection (DPI) is needed to inspect the service request or communicated data packets for the service between the UE and the first core network element for service statistics. Deep packet inspection functionality can be located independently or collocated with the first core network element. DPI can be done to determine the statistics for further policy applying. In some scenarios, corresponding packets will be delivered to the DPI functionality from the first core network element and a DPI results will be returned, thus the service statistics are obtained. It will be appreciated by one skilled in the art that if the policy is blocking all the services for UEs served by eNodeB 110, then DPI is not required.

It is noted that the service statistics comprise the service related information which can be obtained from the service data flow, such as service content, service bit rate, service priority, etc.

It is also noted that the UE statistics mainly refer to location related UE statistics, such as a list of UEs within the location, and network user location information of the UE.

In one embodiment, the administrator may configure some UEs with privileges, such information can be comprised in the policy, such as in the form of list of UEs for second service control, and carried out by the first core network element.

The administrator can input duration, or a termination trigger, or condition for carrying out the policy, either alone or together with other service control configurations; accordingly, such information can be comprised in the policy or sent in other messages independently to the first network element.

It will be appreciated by one skilled in the art that although in some embodiments only one UE is described, the embodiments can be applied to multiple UEs concurrently.

It will be appreciated by one skilled in the art that the IP address comprises user plane IP address and control plane IP address, either of which is applied as appropriate.

It will be appreciated by one skilled in the art that the UE ID can be Mobile Subscriber International ISDN/PSTN number (MSISDN), UE IP, International Mobile Subscriber Identification Number (IMSI), etc.

Figure 4:
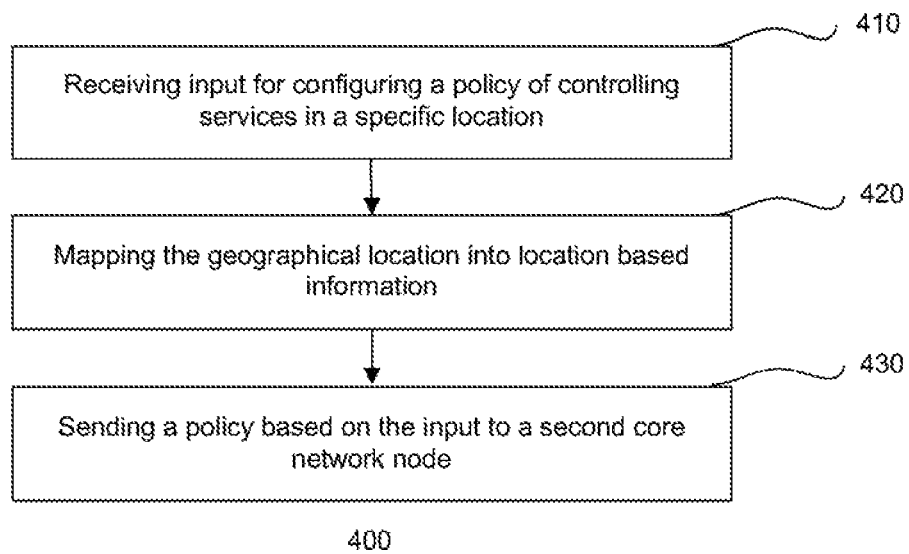
FIG. 4 illustratively shows a method 400 for a network element in a wireless communication network controlling UE services in a designated location in accordance with an embodiment of the disclosure.

FIG. 4 illustratively shows a method 400 for a network element in a wireless communication network controlling UE services in a designated location in accordance with an embodiment of the disclosure. The network element can also be referred to as SSCDF that acts as an interface for the service control administrators to input service control configurations, which may be functionality collocated with legacy network element or independently located in the LTE network 100. The method comprises, at step 410, receiving an input for configuring a policy of controlling services in a specific location, wherein the input comprises geographical location and the policy comprises location based information corresponding to the geographical location, wherein the location based information comprises one or more of the following: radio base station IP, mobile management entity IP, tracking area, E-UTRAN cell global identifier, or comprises one or more of the following: a list of idle UEs and connected UEs in the geographical location; then at step 420, mapping the geographical location into the location based information; and finally, sending a policy based on the input to a second core network node, which is preferably a PGW.

Figure 5:
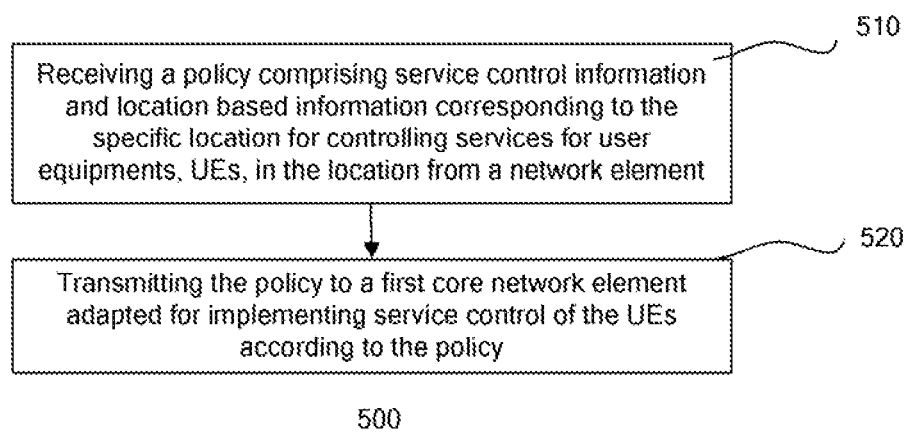
FIG. 5 illustratively shows a method 500 for a second core network element in a wireless communication network controlling UE services in accordance with an embodiment of the disclosure.

FIG. 5 illustratively shows a method 500 for a second core network element in a wireless communication network controlling UE services in accordance with an embodiment of the disclosure. The method comprises: at step 510, receiving a policy comprising service control information and location based information corresponding to the specific location for controlling services for UEs in the location from a network element; and at step 520, transmitting the policy to a first core network element adapted for implementing service control of the UEs according to the policy.

Figure 6:
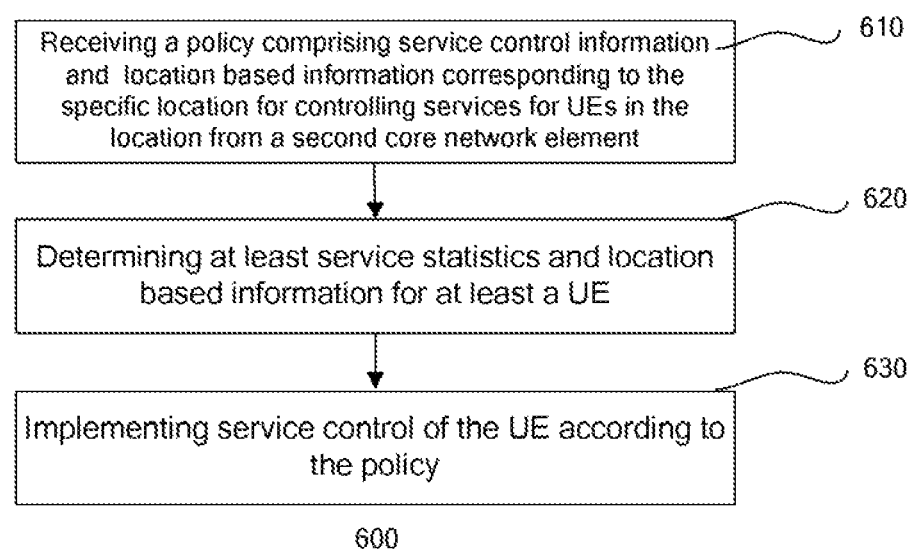
FIG. 6 illustratively shows a method 600 for a first core network element in a wireless communication network controlling UE services in accordance with an embodiment of the disclosure.

FIG. 6 illustratively shows a method 600 for a first core network element in a wireless communication network controlling UE services in accordance with an embodiment of the disclosure. The method comprises: at step 610, receiving a policy comprising service control information and location based information corresponding to the specific location for controlling services for user equipments, UEs in the location from a second core network element; at step 620, determining service statistics and location based information for at least a UE; and at step 630, implementing the service control, or not, of the UE according to the policy. The location based information comprises one or more of the following: radio base station IP, mobile management entity IP, tracking area, E-UTRAN cell global identifier; or one or more of the following: a list of idle UEs and connected UEs in the location. The policy further comprises at least a list of UEs for at least second service control of the UEs in the list. The at least a UE is the UE currently in the service and/or that initiates a request for the service.

Figure 7:
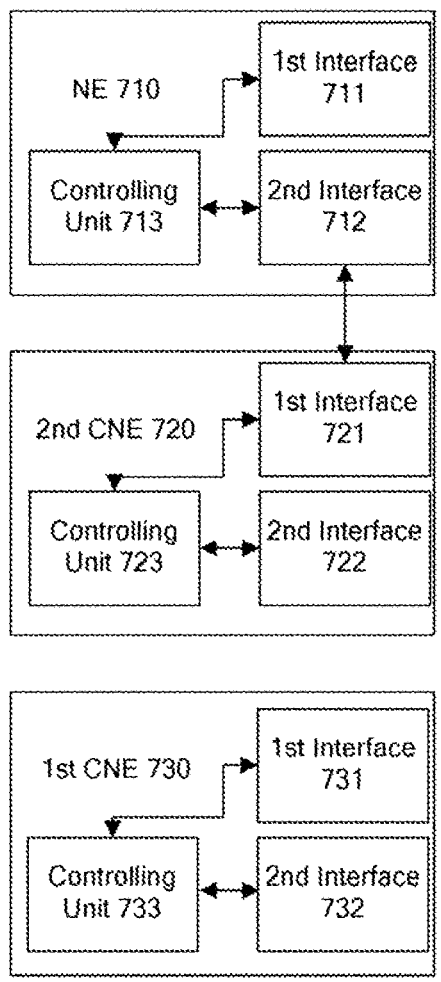
FIG. 7 illustratively shows a block diagram of a network element 710, a second core network element 720 and a first core network element 730 involved in the UE service control in accordance with an embodiment of the disclosure.

FIG. 7 illustratively shows a block diagram of a network element 710, a second core network element 720 and a first core network element 730 involved in the UE service control in accordance with an embodiment of the disclosure.

The network element 710 comprises a first interface 711 adapted for obtaining input for configuring a policy of controlling services in a specific location, a second interface 712 adapted for communicating with a second core network node 720 and a controlling unit 713. The controlling unit 713 is adapted for: receiving input for configuring a policy of controlling services in a specific location via the first interface; and sending a policy based on the input to a second core network element via the second interface.

The second core network element 720 comprises a first interface 721 adapted for communicating with a network element 710, a second interface 722 adapted for communicating with a first core network element 730 and a controlling unit 723. The controlling unit 723 is adapted for: receiving a policy comprising service control information and location based information corresponding to the specific location for controlling services of user equipments, UEs, in the location via the first interface; and transmitting the policy to a first core network element adapted for implementing service control of the UEs according to the policy via the second interface.

The first core network element 730 comprises a first interface 731 adapted for communicating with a second core network element 720, a second interface 732 adapted for communicating with at least one UE and a controlling unit 733. The controlling unit 733 is adapted for: receiving a policy comprising service control information and location based information corresponding to the specific location for controlling services for UEs in the location via the first interface; determining service statistics and location based information for at least a UE via the second interface; and implementing the service control, or not, of the UE according to the policy.

It should be noted that all the elements above may be implemented by software or hardware or the combination thereof. For example, the controlling unit may comprise a processing unit, which may be provided on a single chip or a chip module and which may be any processor or computer device that performs operations based on program codes or instructions stored in a memory. Program codes are fetched from the memory and loaded into the processing unit in order to perform the steps described in connection with FIGS. 4 to 6. The controlling unit may share the same processing unit or memory with the element, or use separate hardware.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention is not be limited to the particular embodiment disclosed as the best mode contemplated for carrying out the present invention, but that the present invention include all embodiments falling within the scope of the appended claims.

What is claimed is:

1. A method for a first core network element in a wireless communication network controlling services in a specific location, the method comprising:
receiving, from a second core network, a policy comprising:
service control information comprising at least information of first service control; and
location based information corresponding to the specific location for controlling services for user equipments (UEs) in the location, the location based information corresponding to network user location information based on at least one geographical location, the at least one geographical location being mapped into the network user location information;
determining service statistics and location based information for at least a UE; and
one of implementing and not implementing the service control of the UE according to the policy.

2. The method of claim 1, wherein the location based information comprises at least one selected from the group consisting of: a radio base station IP, a mobile management entity IP, a tracking area, and an Evolved Universal Mobile Telecommunications System (UMTS) Terrestrial Radio Access Network (E-UTRAN) cell global identifier.

3. The method of claim 1, wherein the location based information comprises at least one selected from the group consisting of: a list of idle UEs and connected UEs in the location.

4. The method of claim 1, wherein the policy further comprises at least a list of UEs for at least second service control of the UEs in the list.

5. The method of claim 1, wherein determining service statistics and location based information for at least a UE comprises determining service statistics and location based information for at least one of a UE currently in the service and that initiates a request for the service.

6. A first core network element in a wireless communication network for controlling services in a specific location, the first core network element comprising at least one processor configured to:
receive a policy comprising:
service control information comprising at least information of first service control; and
location based information corresponding to the specific location for controlling services for user equipments (UEs) in the location, the location based information corresponding to network user location information based on at least one geographical location, the at least one geographical location being mapped into the network user location information;
determine service statistics and location based information for at least a UE; and
one of implement and not implement the service control of the UE according to the policy.

7. The core network element of claim 6, wherein the location based information comprises at least one selected from the group consisting of: a radio base station IP, a mobile management entity IP, a tracking area, and an Evolved Universal Mobile Telecommunications System (UMTS) Terrestrial Radio Access Network (E-UTRAN) cell global identifier.

8. The core network element of claim 6, wherein the location based information comprises at least one selected from the group consisting of: a list of idle UEs and connected UEs in the location.

9. The core network element of claim 6, wherein the policy further comprises at least a list of UEs for at least second service control of the UEs in the list.

10. The core network element of claim 6, wherein determining service statistics and location based information for at least a UE comprises determining service statistics and location based information for at least one of a UE currently in the service and that initiates a request for the service.

11. A method for a network element in a wireless communication network configuring a policy of controlling services in a specific location, the method comprising:
receiving input for configuring the policy of controlling services in a specific location, the input comprising at least one geographical location and the policy comprising at least:
service control information comprising at least information of first service control; and
location based information, the location based information corresponding to the specific location for controlling services for user equipments (UEs) in the specific location, the location based information corresponding to network user location information based on the at least one geographical location;
mapping the at least one geographical location into the network user location information; and
sending the policy based on the input to a second core network node.

12. The method of claim 11, wherein the location based information comprises:
at least one selected from the group consisting of: a radio base station IP, a mobile management entity IP, a tracking area, and an Evolved Universal Mobile Telecommunications System (UMTS) Terrestrial Radio Access Network (E-UTRAN) cell global identifier; or
at least one selected from the group consisting of: a list of idle UEs and connected UEs in the geographical location.

13. The method of claim 12, wherein mapping the at least one geographical location into the network user location information is based on one selected from the group consisting of a mapping table configured in the network element and information synchronized from the core network.

14. A network element in a wireless communication network for configuring a policy of controlling services in a specific location, the network element comprising at least one processor configured to:
receive input for configuring a policy of controlling services in a specific location, the input comprising at least one geographical location and the policy comprising at least:
service control information comprising at least information of first service control; and
location based information, the location based information corresponding to the specific location for controlling services for user equipments (UEs) in the specific location, the location based information corresponding to network user location information based on the at least one geographical location;
map the at least one geographical location into the network user location information; and
send a policy based on the input to a second core network element.

15. The network element of claim 14, wherein the location based information comprises:
at least one selected from the group consisting of: a radio base station IP, a mobile management entity IP, a tracking area, and an Evolved Universal Mobile Telecommunications System (UMTS) Terrestrial Radio Access Network (E-UTRAN) cell global identifier; or
at least one selected from the group consisting of: a list of idle UEs and connected UEs in the geographical location.

16. The network element of claim 14, wherein the at least one processor is further configured to map the at least one geographical location into the network user location information based on one selected from the group consisting of a mapping table configured in the network element and information synchronized from the core network.

\* \* \* \* \*